US007373772B2

(12) United States Patent
Simons et al.

(10) Patent No.: US 7,373,772 B2
(45) Date of Patent: May 20, 2008

(54) TURBINE COMBUSTOR TRANSITION PIECE HAVING DILUTION HOLES

(75) Inventors: Derrick Walter Simons, Greer, SC (US); Aja Kumar Gupta, Greer, SC (US); Carey Edward Romoser, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 607 days.

(21) Appl. No.: 10/801,533

(22) Filed: Mar. 17, 2004

(65) Prior Publication Data

US 2005/0204741 A1 Sep. 22, 2005

(51) Int. Cl.
*F02C 3/14* (2006.01)
*F02C 7/18* (2006.01)

(52) U.S. Cl. .......................... 60/39.37; 60/752; 60/754

(58) Field of Classification Search ............... 60/39.37, 60/752, 754

See application file for complete search history.

(56) References Cited

U.S. PATENT DOCUMENTS 2,479,573 A * 8/1949 Howard ..................... 60/39.37
2,958,194 A * 11/1960 Bayley ........................ 60/760
4,244,178 A * 1/1981 Herman et al. ............... 60/754
6,018,950 A * 2/2000 Moeller ....................... 60/752
6,105,371 A * 8/2000 Ansart et al. ................. 60/754
6,546,627 B1 * 4/2003 Sekihara et al. .............. 60/752
6,568,187 B1 5/2003 Jorgensen et al.
6,640,547 B2 * 11/2003 Leahy, Jr. .................... 60/752
6,644,032 B1 11/2003 Jorgensen et al.

FOREIGN PATENT DOCUMENTS

EP 05251400.7 3/2005

OTHER PUBLICATIONS

EPO Search Report dated Nov. 11, 2005.

* cited by examiner

*Primary Examiner*—Ted Kim
(74) *Attorney, Agent, or Firm*—Nixon & Vanderhye, PC

(57) ABSTRACT

A transition piece body, having an inlet end for receiving combustion products from a turbine combustor and an outlet end for flowing the gaseous products into a first stage nozzle, has dilution holes in zones respectively adjacent the transition piece body inlet and outlet ends. The volume of dilution air flowing into the gas stream is substantially equal at the inlet and outlet ends of the transition piece. The locations and sizes of the openings are given in the respective X, Y, Z coordinates and hole diameters in Table I. The X and Y coordinates lie in the circular plane of the transition body at its inlet end and the Z coordinates extend in the direction of gas flow from the origin.

12 Claims, 2 Drawing Sheets

TURBINE COMBUSTOR TRANSITION PIECE HAVING DILUTION HOLES

BACKGROUND OF THE INVENTION

The present invention relates to a combustor transition piece for flowing combustion products between a turbine combustor and a first stage nozzle and particularly relates to a transition piece having dilution holes to aid in dilution mixing and promoting emissions reduction.

It is well known that air-polluting emissions are typically produced in gas turbines burning conventional hydrocarbon fuels. Those emissions are usually oxides of nitrogen, carbon monoxide and unburned hydrocarbons. It is also well known that oxidation of molecular nitrogen is dependent upon the temperature of the hot gas stream produced by the turbine combustor and which hot gas stream flows through a transition piece to the first stage nozzle. The residence time for the reactants at these high temperatures is also a factor in the production of the undesirable emissions.

Various concepts have been proposed and utilized to maintain the reaction zone temperatures below the level at which thermal $NO_x$ is formed or by reducing the residence time at high temperatures such that there is insufficient time for the $NO_x$ formation reaction to go forward, or both. One method of reducing the temperature of the reactants in the combustor is to provide a lean mixture of fuel and air prior to combustion. Thus, dilution air is oftentimes provided within the combustion liner to absorb heat and reduce the temperature rise to a level where thermal $NO_x$ is not formed. However, in many cases, and even with lean premixed fuel and air, the temperatures are sufficient to produce undesirable emissions.

Dilution air has previously been provided in the transition piece between the combustor and the first stage nozzle. For example, in a prior art transition piece, two dilution holes have been provided adjacent the outlet of the transition piece at a location close to the first stage nozzle. However, undesirable emissions remain a problem, notwithstanding various prior proposals to reduce those emissions.

BRIEF DESCRIPTION OF THE INVENTION

In a preferred embodiment of the present invention, there is provided a transition piece dilution air management system which promotes dilution mixing and emissions reduction. Particularly, the dilution air management system provides dilution air jets in the combustion transition piece at predetermined axial and circumferential locations to optimize reductions in emissions consistent with efficient use of expensive compressor discharge air. Particularly, the transition piece includes a body having an inlet for receiving combustion products from the combustor and an outlet for flowing the combustion products into the first stage nozzle. The transition piece body defines an enclosure for confining the flow of combustion products between its inlet and outlet ends. A plurality of dilution holes are formed in a first zone adjacent the inlet end of the transition piece body and also in a second zone adjacent the outlet end of the transition piece body.

In one aspect hereof, the dilution holes are sized such that substantial equal quantities of dilution air flow into the flowpath in the respective zones. In another aspect, the holes are located in the transition piece body in accordance with the hole numbers 1 through 7 and X, Y, Z coordinates set forth in the following Table I, wherein the X, Y, Z coordinates have an origin at the center of the circular inlet to the transition body with the Z coordinates extending from the origin in a downstream flow direction toward the outlet end. The holes lie along the transition piece body in an envelope within one inch in any direction along the surface of the transition piece body from the locations of the holes determined by the X, Y, Z coordinates.

DETAILED DESCRIPTION OF THE INVENTION

Figure 1:
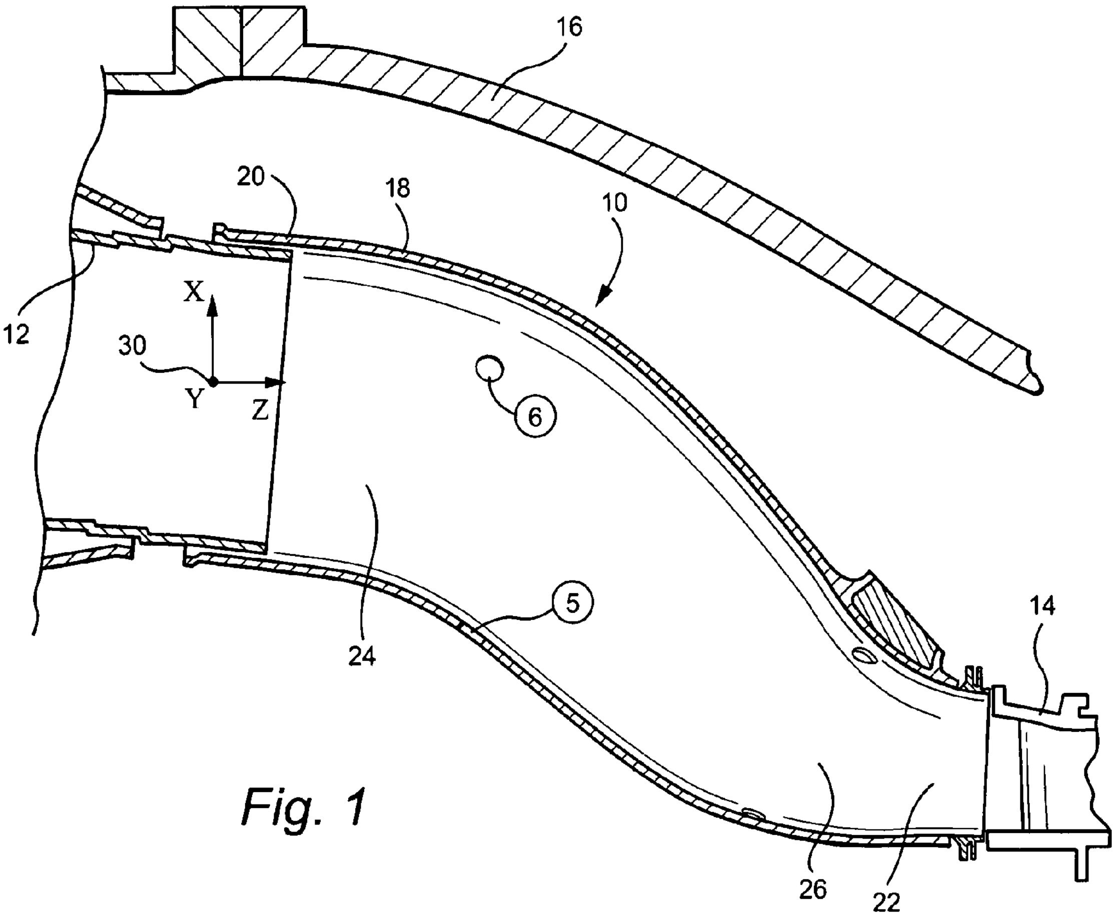
FIG. 1 is a fragmentary cross-sectional view illustrating a transition piece for flowing combustion products between a combustor and a first stage nozzle and encompassed within an outer casing.

Referring now to the drawings, particularly to FIG. 1, there is illustrated a transition piece, generally designated 10, for enclosing and confining combustion products for flow from a combustor 12 of a gas turbine to a first stage nozzle 14. It will be appreciated that there is an annular array of combustors for generating and flowing hot gases to the annular array of nozzles 14, one each of such combustors 12, nozzles 14 and transition pieces 10 being illustrated. Also illustrated is a part of the compressor discharge casing 16. Compressor discharge air typically is provided within the space between the casing 16 and the combustor 12 and transition piece 10. The compressor discharge air is at a positive pressure for flow as dilution air into the transition piece and is at high temperature, for example, about 700° F.

As illustrated, the transition piece 10 includes a body or enclosure 18 for confining and directing the flow of combustion products from combustor 12 to nozzle 14. Thus, the transition piece body 18 includes an inlet end 20 and an outlet end 22 for respectively receiving the gases and flowing the gases into the nozzle 14. The inlet end 20 of the transition piece 10 is generally circular. The transition piece body 18 transitions from the circular inlet end generally axially and radially inwardly relative to the turbine axis and terminates in a slightly arcuate, generally rectilinear outlet end 12 adjacent the first stage nozzle 14.

In accordance with an aspect of the present invention, there are provided a plurality of dilution holes 28 in the body 18. The holes are formed in first and second zones 24 and 26, respectively, adjacent the inlet and outlet ends of the body 18. In accordance with a preferred aspect of the present invention, the second zone adjacent the outlet end of the body 18 has a plurality of holes, preferably four holes numbered in drawing FIG. 2, 1 through 4. Drawing holes 1 and 2 are located along the bottom surface of the transition piece body 18 adjacent the outlet end 22, while holes 3 and 4 are located along the opposite upper surface adjacent the outlet 22. The first zone 24 adjacent the inlet end of body 18 includes a plurality of holes, preferably three holes, numbered 5, 6, and 7, respectively, in FIG. 2. Because the inlet end 20 is circular, and the body 18 immediately commences its transition from the circular cross-section at inlet end 20 to a generally rectilinear cross-section at the outlet 22 end, the holes 5, 6, and 7, are generally symmetrical about a generally circular cross-section near the inlet end 20.

To efficiently promote dilution mixing and reduce the temperature of the products of combustion flowing through the transition piece body 18, it is preferable to provide an equal amount of dilution air flowing into the transition body at its opposite ends with the jets of air generally directed toward a central axis of the flow stream through the body 18. The holes 28 through the body are thus formed in a direction normal to the surface to direct jets of air toward the axes of the flow. It will be appreciated that the size of the holes dictate the penetration of the dilution air jets flowing into the gas stream and their location adjacent opposite ends of the body has been proven effective to lower the temperature of the gas stream to reduce emissions.

In a preferred embodiment, the size and location of the holes in the transition piece body may be ascertained from Table I below wherein the holes are located in accordance with the hole numbers 1 through 7 and X, Y, Z coordinates set forth in Table I. The X, Y, Z coordinates have an origin 30 (FIG. 1) at the center of the circular inlet with the Z coordinate extending from the origin in a downstream flow direction toward the outlet end. The Table I below also gives the hole diameter for each of the numbered holes 1 through 7. It will be appreciated that, while the X, Y, Z coordinates are carried out to three decimal places, the holes may lie along the transition piece body within an envelope of one inch in any direction along the surface of the transition body from the holes locations determined by the X, Y, Z coordinates.

TABLE I

| Hole # | Hole Diameter | X | Y | Z |
|---|---|---|---|---|
| 1 | 1.000 | −16.319 | −3.859 | 26.485 |
| 2 | 1.000 | −16.681 | 1.888 | 26.485 |
| 3 | 1.120 | −8.702 | −6.500 | 30.845 |
| 4 | 1.120 | −8.702 | 6.500 | 30.845 |
| 5 | 1.230 | −7.838 | 0.000 | 8.874 |
| 6 | 1.230 | 2.485 | −6.467 | 12.838 |
| 7 | 1.230 | 2.485 | 6.467 | 12.838 |

Figure 2:
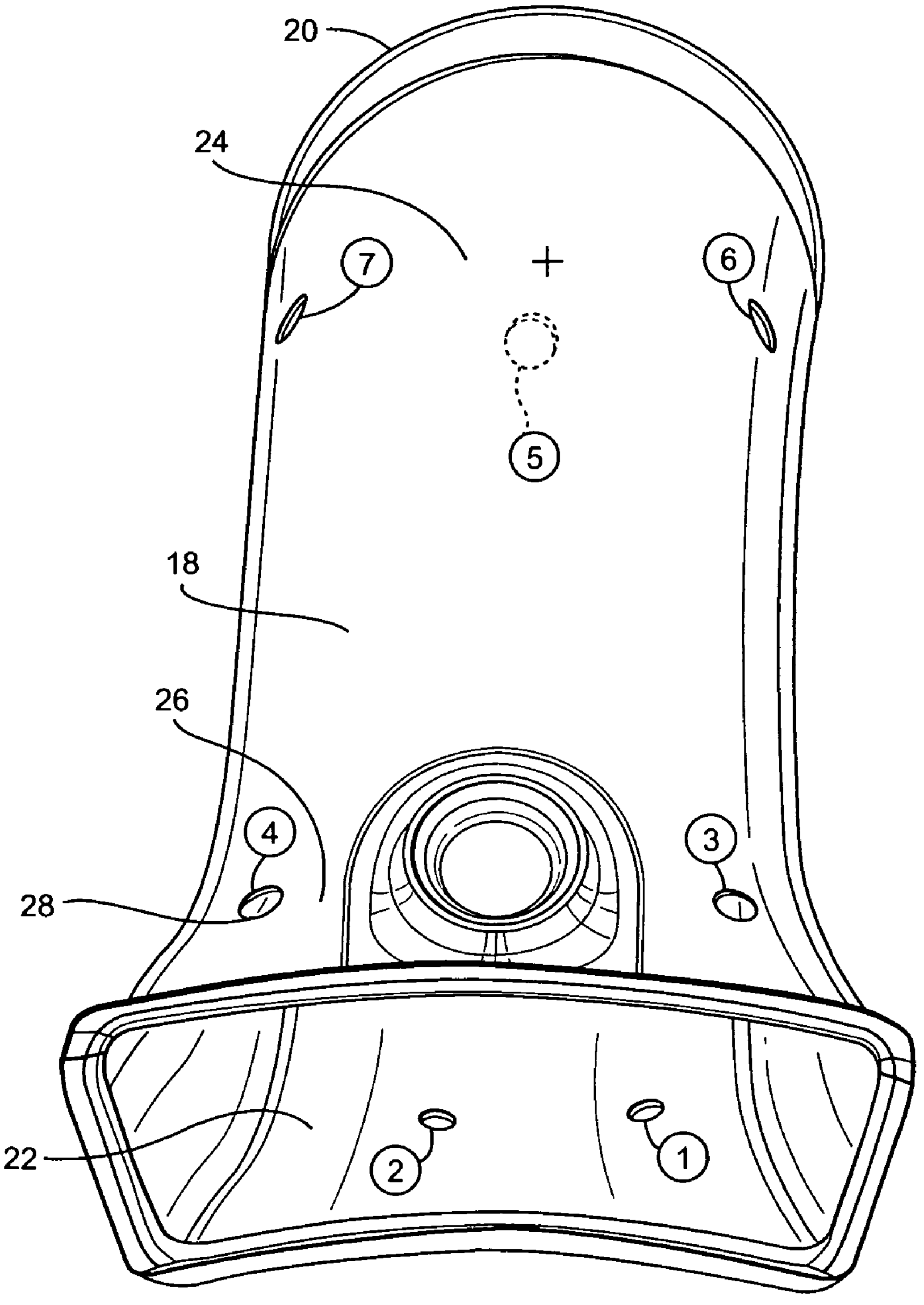
FIG. 2 is an oblique view of the transition piece taken generally from above the outlet end thereof.

As can be seen from Table I and with reference to drawing FIG. 2, zone 26 has holes 1 and 2 of equal diameter. Holes 3 and 4 are equal in diameter to one another but have different diameters than the diameters of holes 1 and 2. The holes 5, 6 and 7 in the first zone 24 adjacent the inlet end 20 all have equal diameters.

The magnitude of the dilution air provided the inlet and outlet ends of the transition piece body is substantially equal. Preferably, the total dilution air flow for effective dilution mixing and efficient emissions reduction for this exemplified embodiment of the transition piece has been found to be about 7.10 square inches. Consequently, the total area of the holes 5, 6 and 7 at the first zone adjacent the inlet end 20 afford a total preferred dilution area of about 3.55 square inches and, similarly, the holes 1 through 3 adjacent the second zone and outlet end 22 of the transition piece body provide a total preferred dilution area of about 3.55 square inches. Thus, it will be appreciated that the dilution holes machined into the transition piece at the specified axial and circumferential locations aid in dilution mixing and promoting emissions reduction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustion system component for location between a turbine combustor and a first stage turbine airfoil, comprising:

a transition piece including a body defining a flowpath and having a generally circular inlet end for receiving combustion products from the combustor and a generally rectilinear outlet end for flowing the combustor products into the first stage nozzle;

said body defining between said inlet end and said outlet end an enclosure for confining the flow of combustion products between said ends;

a plurality of dilution holes formed in said transition piece body in a first zone adjacent said inlet end and in a second zone adjacent said outlet end for flowing dilution air into the transition piece body;

said dilution holes being sized such that substantial equal quantities of the dilution air flow into the flowpath in said zones, respectively; and wherein said holes are located in said transition piece body in accordance with the hole numbers 1 through 7 and X, Y, Z coordinates set forth in Table I wherein the X, Y, Z coordinates have an origin at the center of the circular inlet end with the Z coordinates extending from the origin in a downstream flow direction toward the outlet end, said holes lying along said transition piece body in an envelope within one inch in any direction along the surface of the transition piece body from the locations of the holes determined by said X, Y, Z coordinates.

2. A system according to claim 1 wherein said plurality of holes in said first and second zones are unequal in number to one another.

3. A system according to claim 1 wherein said first zone includes three holes and said second zone includes four holes.

4. A system according to claim 1 wherein said holes in said transition piece body in said first zone are circular and have equal diameters.

5. A system according to claim 1 wherein said holes in said transition piece body in said second zone are four in number, with at least a pair of said four holes being circular and equal in diameter.

6. A system according to claim 5 wherein said holes in said transition piece body in said first zone are three in number with each hole being circular and equal in diameter to other holes in said first zone.

7. A system according to claim 1 wherein said holes have a total area of about 7.10 square inches.

8. A combustion system component for location between a turbine combustor and a first stage turbine nozzle, comprising:

a transition piece including a body defining a flowpath and having a generally circular inlet end for receiving combustion products from the combustor and a generally rectilinear outlet end for flowing the combustor products into the first stage nozzle;

said body defining between said inlet end and said outlet end an enclosure for confining the flow of combustion products between said ends; and a plurality of dilution holes formed in said body, said holes being located in said transition piece body in accordance with the hole numbers 1 through 7 and X, Y, Z coordinates set forth in Table I wherein the X, Y, Z coordinates have an origin at the center of the circular inlet end with the Z coordinates extending from the origin in a downstream flow direction toward the outlet end, said holes lying along said transition piece body in an envelope within one inch in any direction along the surface of the transition piece body from the locations of the holes determined by said X, Y, Z coordinates.

9. A system according to claim 8 wherein said holes in said transition piece body in said first zone are circular and have equal diameters.

10. A system according to claim 8 wherein said holes in said transition piece body in said second zone are four in number, with at least a pair of said four holes being circular and equal in diameter.

11. A system according to claim 10 wherein said holes in said transition piece body in said first zone are three in number with each hole being circular and equal in diameter to other holes in said first zone.

12. A system according to claim 11 wherein said holes have a total area of about 7.10 square inches.

* * * * *

UNITED STATES PATENT AND TRADEMARK OFFICE

CERTIFICATE OF CORRECTION

PATENT NO. : 7,373,772 B2
APPLICATION NO. : 10/801533
DATED : May 20, 2008
INVENTOR(S) : Simons et al.

It is certified that error appears in the above-identified patent and that said Letters Patent is hereby corrected as shown below:

At column 3 line 53, delete "3" and insert --4--

Signed and Sealed this

Twenty-fourth Day of February, 2009

John Doll

JOHN DOLL
*Acting Director of the United States Patent and Trademark Office*